United States Patent
Lim et al.

(10) Patent No.: US 10,601,136 B2
(45) Date of Patent: Mar. 24, 2020

(54) ANTENNA MODULE

(71) Applicant: AMOTECH CO., LTD., Incheon (KR)

(72) Inventors: Ki-Sang Lim, Incheon (KR); Jin-Won Noh, Gwangju (KR); Hyung-IL Baek, Gyeonggi-do (KR); Beom-Jin Kim, Incheon (KR); Yong-Ho Hwang, Incheon (KR)

(73) Assignee: AMOTECH CO., LTD., Namdong-gu Incheon (KR)

( * ) Notice: Subject to any disclaimer, the term of this patent is extended or adjusted under 35 U.S.C. 154(b) by 206 days.

(21) Appl. No.: 15/742,324

(22) PCT Filed: Jul. 7, 2016

(86) PCT No.: PCT/KR2016/007379
§ 371 (c)(1),
(2) Date: Jan. 5, 2018

(87) PCT Pub. No.: WO2017/007262
PCT Pub. Date: Jan. 12, 2017

(65) Prior Publication Data
US 2018/0219291 A1 Aug. 2, 2018

(30) Foreign Application Priority Data
Jul. 7, 2015 (KR) .......................... 10-2015-0096676

(51) Int. Cl.
H01Q 7/00 (2006.01)
H01Q 9/04 (2006.01)
G06K 19/077 (2006.01)
H01Q 1/24 (2006.01)
G06Q 20/32 (2012.01)

(52) U.S. Cl.
CPC ..... *H01Q 9/0407* (2013.01); *G06K 19/07773* (2013.01); *H01Q 1/243* (2013.01); *H01Q 7/00* (2013.01); *G06Q 20/3278* (2013.01)

(58) Field of Classification Search
CPC ........................... H01Q 9/0407; H01Q 1/243
See application file for complete search history.

(56) References Cited

FOREIGN PATENT DOCUMENTS

| JP | 2005-184094 A | 7/2005 |
|----|---------------|--------|
| JP | 2009-284476 A | 12/2009 |
| JP | 2014-036363 A | 2/2014 |
| JP | 2014-161003 A | 9/2014 |
| KR | 10-2007-0113770 A | 11/2007 |

*Primary Examiner* — Graham P Smith
(74) *Attorney, Agent, or Firm* — Baker & Hostetler LLP

(57) ABSTRACT

The antenna module disclosed, as the antenna module formed with a type of a flexible printed circuit board, and mounted adjacent to an end portion of a mobile terminal, includes a lower layer sheet mounted on the mobile terminal, and having a first radiation pattern formed on the lower layer sheet; an electromagnetic wave shielding sheet with an area narrower than the lower layer sheet, and layered on an top of the lower layer sheet; an upper layer sheet layered on an top of the electromagnetic wave shielding sheet, and having a second radiation pattern formed on the upper layer sheet, a part of both ends of the upper layer sheet being attached to the lower layer sheet; and a connecting portion connecting the first radiation pattern and the second radiation pattern.

15 Claims, 12 Drawing Sheets

ANTENNA MODULE

CROSS-REFERENCE TO THE RELATED APPLICATIONS

This application is a National Stage of International Application No. PCT/KR2016/007379, filed Jul. 7, 2016, which claims priority from Korean Patent Application No. 10-2015-0096676 filed on Jul. 7, 2015 in the Korean Intellectual Property Office, the disclosure of which are incorporated herein by reference in their entirety.

TECHNICAL FIELD

Exemplary embodiments of the present disclosure relate to an antenna module, and more particularly, to an antenna module that is embedded in an end portion of a mobile terminal to perform a near field communication or an electronic payment (for example, such as Samsung Pay).

BACKGROUND ART

Along with technology development, mobile terminals, such as a mobile phone, a PDA, a PMP, a navigator, and a laptop, additionally provide the functions, such as a DMB, a wireless internet, a near field communication between the devices, in addition to fundamental functions, such as call, video/music playbacks, and navigation. Accordingly, the mobile terminals include a plurality of antennas for a wireless communication, such as a wireless internet and a Bluetooth.

In addition, there is a recent trend that the functions, such as information exchange between the terminals, payment, ticket reservation, search, using a near field communication (i.e., a NFC, a Magnetic Secure Transmission (MST)) are applied to the mobile terminals. For this purpose, the mobile terminal is mounted with an antenna module for the mobile terminal (i.e., a NFC antenna module) used in a near field communication method. In this case, the NFC antenna module used is one of an electronic tags (RFID), and as a non-contact type near filed communication module using a frequency band of about 13.56 MHz, sends data between the terminals at a short distance of about 10 cm. The NFC, other than payment, is widely used for transmission of product information at a supermarket or a store and travel information for a visitor, transportation, a lock device for access control and the like.

Recently, there is a trend that a cover of a metal material (hereinafter, a metal cover) is increasingly applied to a mobile terminal, such as a tablet, a mobile phone. In this case, as illustrated in FIG. 1, in the case that the whole of a rear cover 11 of the mobile terminal is formed with a metal material, there is a problem that it is difficult to implement performance of a NFC antenna 13 mounted on a main body 12 of the mobile terminal. Accordingly, the research for implementing performance of the NFC antenna continues to proceed.

As an example, as illustrated in FIG. 2, a conventional mobile terminal 20 to which a metal cover 21 is applied forms a slit 22 (or an opening portion) on the metal cover for implementing performance of a NFC antenna, and mounts the NFC antenna in order to partially overlap with the slit 22. Accordingly, it is possible to implement performance of the NFC antenna through a coupling effect between the NFC antenna and the metal cover through the slit 22.

However, in case of forming a slit or an opening portion for implementing performance of the NFC antenna, there are the problems in that a manufacturing process of a mobile terminal becomes complicated to thus increase manufacturing costs, and the limitation that should reflect a slit or an opening portion in an exterior design occurs.

Meanwhile, as illustrated in FIGS. 3 and 4, as the user circumstance of the mobile terminal recently becomes various, a user demand for a structure that can perform a near field communication in a vertical direction (i.e., a side surface of the mobile terminal) as well as in a horizontal direction (i.e., a rear surface of the mobile terminal) is increasing.

However, as illustrated in FIG. 5, since a conventional NFC antenna 30 is formed with the shape winding a coil pattern 32 on an upper surface of a ferrite sheet 31, there is a problem in that it is difficult to implement antenna performance in a vertical direction.

DISCLOSURE

Technical Problem

The present disclosure is proposed to solve the above problems, and an object of the present disclosure is to provide an antenna module that layers layer sheets having a radiation pattern formed on both surfaces of an electromagnetic wave shielding sheet, respectively, and connects the radiation patterns through a via hole or by a soldering to form an antenna pattern in a vertical direction of the electromagnetic wave shielding sheet.

Further, another object of the present disclosure is to provide an antenna module that is mounted on an end portion of a mobile terminal to perform a near field communication (for example, a NFC, a MST) on one side and a rear surface of the mobile terminal.

Technical Solution

For achieving the objects, an antenna module in accordance with an embodiment of the present disclosure, as the antenna module that is formed with a flexible printed circuit board, and mounted adjacent to an end portion of a mobile terminal, includes a lower layer sheet mounted on the mobile terminal, and having a first radiation pattern formed on the lower layer sheet; an electromagnetic wave shielding sheet with the area narrower than the lower layer sheet, and layered on top of the lower layer sheet; an upper layer sheet layered on top of the electromagnetic wave shielding sheet, and having a second radiation pattern formed on the upper layer sheet, a part of both ends of the upper layer sheet being attached to the lower layer sheet; and a connecting portion connecting the first radiation pattern and the second radiation pattern.

The lower layer sheet can include a first adhesive sheet, an upper surface of the first adhesive sheet adhered to a lower surface of the electromagnetic wave shielding sheet and the part of both ends of the upper layer sheet; a first radiation pattern having a plurality of radiation lines positioned to be spaced from each other, and layered on a lower surface of the first adhesive sheet; a first resin sheet layered on a lower surface of the first radiation pattern; a lower protection sheet layered on a lower surface of the first resin sheet; and a second adhesive sheet having one surface attached to a lower surface of the lower protection sheet, and having the other surface attached to a rear cover or a main body of the mobile terminal.

In this case, the lower layer sheet can further include a terminal portion having a plurality of terminals, which are interposed between one side of the first resin sheet and one side of the lower protection sheet, positioned to correspond to the plurality of radiation lines, respectively.

Further, the lower layer sheet can further include an outer terminal portion extended in an outside direction from one side of the first resin sheet, and having one surface formed with a plurality of outer terminals to be connected with a connector of the mobile terminal.

The upper layer sheet can include a third adhesive sheet adhered to an upper surface of the electromagnetic wave shielding sheet, a part of both ends of the third adhesive sheet being adhered to an upper surface of the lower layer sheet; a second radiation pattern having a plurality of radiation lines positioned to be spaced from each other, and layered on an upper surface of the third adhesive sheet; a second resin sheet layered on an upper surface of the second radiation pattern; and an upper protection sheet layered on an upper surface of the second resin sheet.

In this case, the upper layer sheet can further include, a terminal portion having a plurality of terminals which are interposed between one side of the second resin sheet and one side of the upper protection sheet, positioned to correspond to the plurality of radiation lines, respectively.

Further, the upper layer sheet can further include an outer terminal portion extended in an outside direction from one side of the second resin sheet, and having one surface formed with a plurality of outer terminals to be connected with a connector of the mobile terminal.

The connecting portion can include a first via hole formed on one side of the lower layer sheet and one side of the upper layer sheet, and connecting the first radiation pattern and the second radiation pattern; and a second via hole formed on the other side of the lower layer sheet and the other side of the upper layer sheet, and connecting the first radiation pattern and the second radiation pattern.

The connecting portion can connect the first radiation pattern and the second radiation pattern to form an antenna pattern in a vertical direction of the electromagnetic wave shielding sheet, and the first radiation pattern, the second radiation pattern, and the connecting portion can be connected with each other to wind the electromagnetic wave shielding sheet.

For achieving the objects, an antenna module in accordance with another embodiment of the present disclosure, as the antenna module formed with a flexible printed circuit board, and mounted adjacent to an end portion of a mobile terminal, includes a lower layer sheet mounted on the mobile terminal, and having a first radiation pattern formed on the lower layer sheet; an electromagnetic wave shielding sheet with an area narrower than the lower layer sheet, and layered on top of the lower layer sheet; an upper layer sheet layered on top of the electromagnetic wave shielding sheet, and having a second radiation pattern, a part of both ends of the upper layer sheet being spaced from the lower layer sheet to form a separated space; and a connecting portion formed in the separated space, which is formed on both ends of the lower layer sheet and the upper layer sheet, and connecting the first radiation pattern and the second radiation pattern.

The lower layer sheet can include a first radiation pattern composed of a plurality of radiation lines positioned to be spaced from each other, and layered on a lower portion of the electromagnetic wave shielding sheet; a first resin sheet layered on a lower surface of the first radiation pattern; a lower protection sheet layered on a lower surface of the first resin sheet; and a first adhesive sheet having one surface attached to a lower surface of the lower protection sheet, and having the other surface attached to a rear cover or a main body of the mobile terminal.

The electromagnetic wave shielding sheet can include a second adhesive sheet having a lower surface adhered to the lower layer sheet; a shielding sheet attached to an upper surface of the second adhesive sheet; and a third adhesive sheet having a lower surface adhered to the shielding sheet, and having an upper surface adhered to a lower surface of the upper layer sheet.

The upper layer sheet can include a second radiation pattern composed of a plurality of radiation lines positioned to be spaced from each other, and layered on an upper surface of the electromagnetic wave shielding sheet; a second resin sheet layered on an upper surface of the second radiation pattern; and an upper protection sheet layered on an upper surface of the second resin sheet.

In this case, the upper layer sheet can further include a terminal portion having a plurality of terminals which are interposed between one side of the second resin sheet and one side of the upper protection sheet, positioned to correspond to the plurality of radiation lines, respectively.

Further, the upper layer sheet can further include an outer terminal portion extended in an outside direction from one side of the second resin sheet, and having one surface formed with a plurality of outer terminals connected with a connector of the mobile terminal.

The connecting portion can include a first soldering portion formed in a separated space, which is formed between one side of the lower layer sheet and one side of the upper layer sheet, and connecting the first radiation pattern and the second radiation pattern; and a second soldering portion formed in a separated space, which is formed between the other side of the lower layer sheet and the other side of the upper layer sheet, and connecting one side of the first radiation pattern and the other side of the second radiation pattern.

The connecting portion can connect the first radiation pattern and the second radiation pattern to form an antenna pattern in a vertical direction of the electromagnetic wave shielding sheet, and the first radiation pattern, the second radiation pattern, the connecting portion can be connected with each other to wind the electromagnetic wave shielding sheet.

Advantageous Effects

In accordance with the present disclosure, by providing the antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there are the effects that can implement performance of a MST antenna required for a standard of the mobile terminal to which a metal cover is applied, and can implement antenna performance that is equal to or better than that of the conventional MST antenna module mounted on the mobile terminal to which a cover of a material, other than a metal, is applied.

Further, by providing the antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there is the effect that can implement performances of a NFC antenna and a MST antenna in a vertical direction (i.e., a side surface of the mobile terminal) as well as in a horizontal direction (i.e., a rear surface of the mobile terminal).

Further, by providing the MST antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there is the effect that can minimize deviation of performance of the NFC antenna and performance of the MST antenna in accordance with an angle therebetween.

Further, by providing the antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there are the effects that can implement an antenna (i.e., the NFC antenna, the MST antenna) characteristic more than a minimum reference for performing a NFC communication on a side surface and a rear surface of the mobile terminal, and can maintain antenna performance that is equal to or better than that of the case mounted on a non-metal cover.

Further, by providing the antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there is the effect that can use even the outermost surface of the antenna module as a radiation pattern forming area, thus minimizing an open area (i.e., the area that cannot form the radiation pattern).

Further, by providing the antenna module that maximizes the radiation pattern forming area to minimize the open area, there is the effect that can increase the area (or a length) of the radiation pattern, thus maximizing antenna performance.

Further, by providing the antenna module that has a one-to-one correspondence with the radiation patterns formed on both surfaces of the shielding sheet and forms terminal portions having the same line width as that of the radiation patterns, there is the effect that can guide the location where a via hole connecting the radiation patterns is formed, thus easily manufacturing an antenna pattern in a vertical direction.

Further, by providing the antenna module that selectively forms an outer terminal portion on at least one of resin sheets included in the layer sheets that are formed on both surfaces of the shielding sheet, there is the effect that can easily connect the antenna module regardless of the location (the height) of a connector formed on the mobile terminal.

BEST MODE FOR INVENTION

Figure 1:
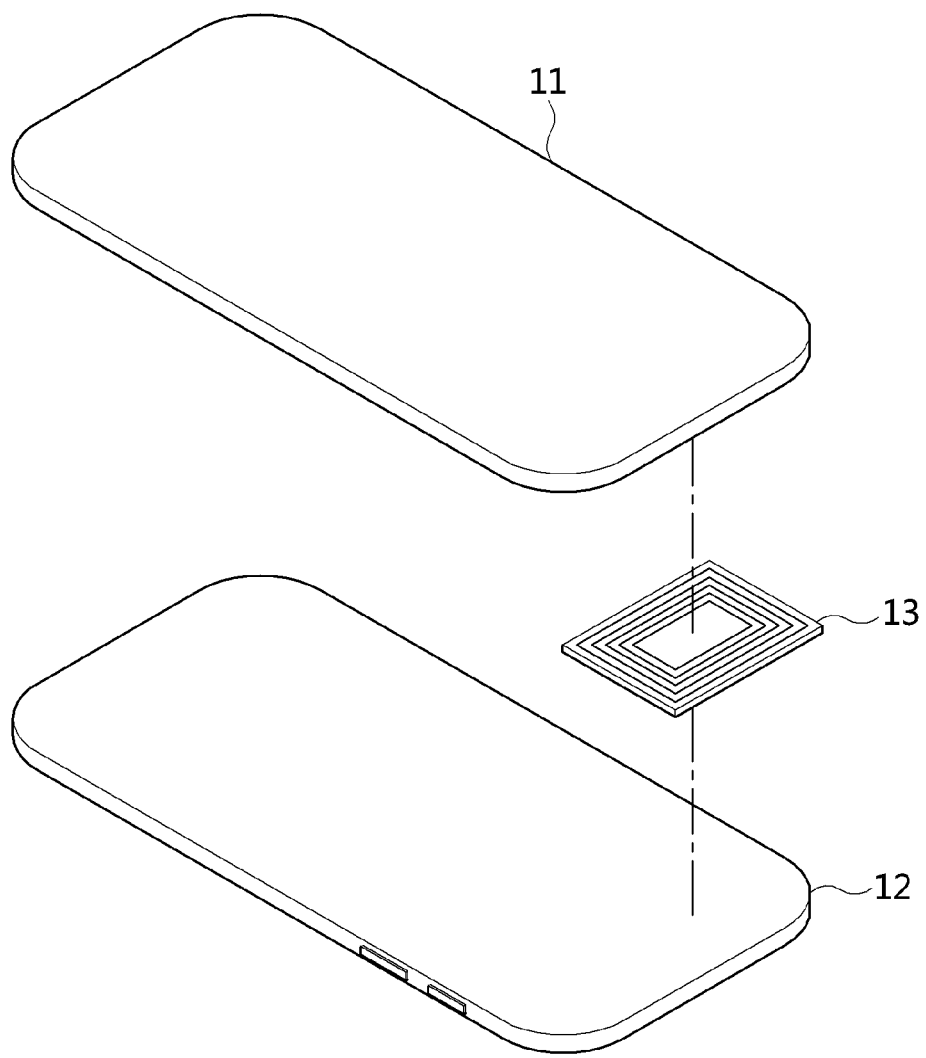
FIGS. 1 to 5 are views explaining a conventional MST antenna module.
Figure 2:
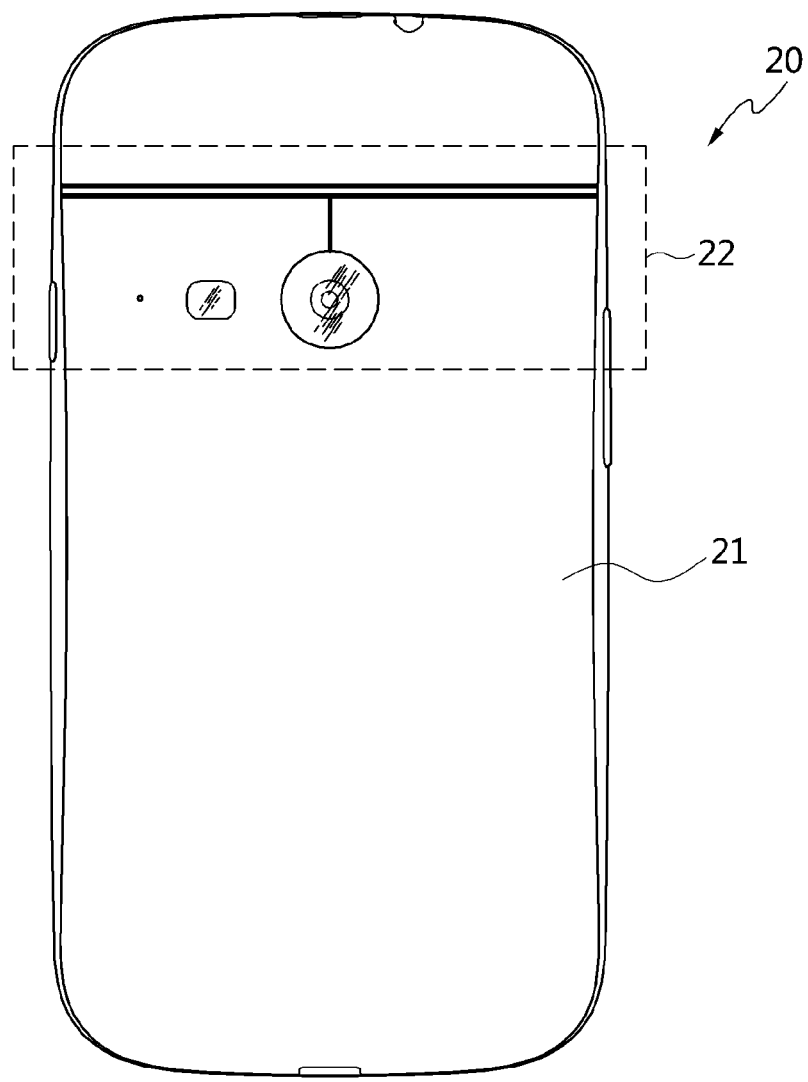
Figure 3:
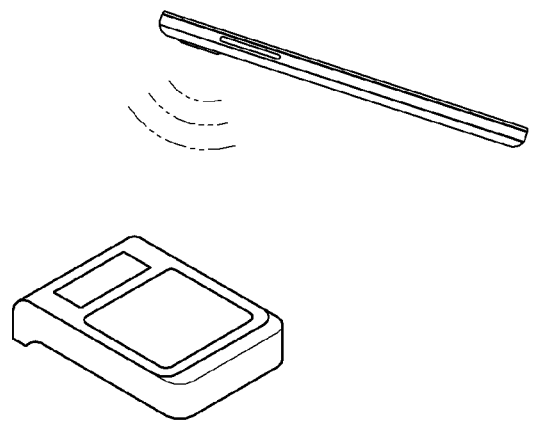
Figure 4:
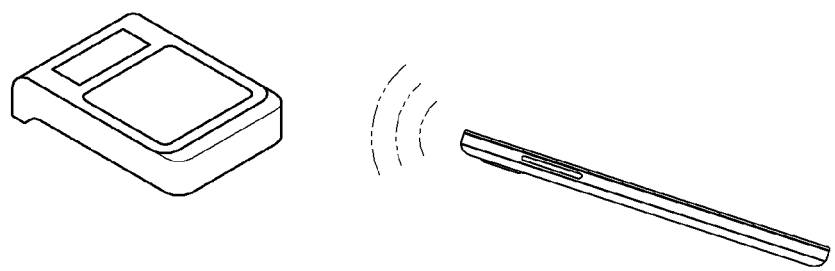
Figure 5:
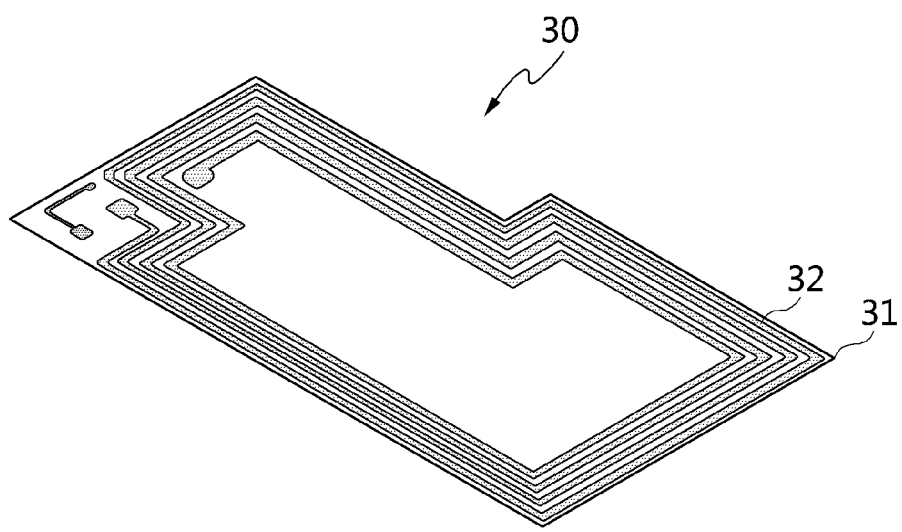

Hereinafter, for detailed explanation to the extent that a person skilled in the art to which the present disclosure pertains can easily embody the technical spirit of the present disclosure, the most preferred embodiments of the present disclosure will be described in detail with reference to the accompanying drawings. First, it should be noted that in denoting reference numerals to the elements in each drawing, the same elements have the same reference numerals if possible even though illustrated in different drawings. Further, in explaining the present disclosure, detailed description of related known configurations and functions will be omitted if it obscures the subject matter of the present disclosure.

Hereinafter, an antenna module in accordance with a first embodiment of the present disclosure will be described in detail with reference to the accompanying drawings.

Figure 6:
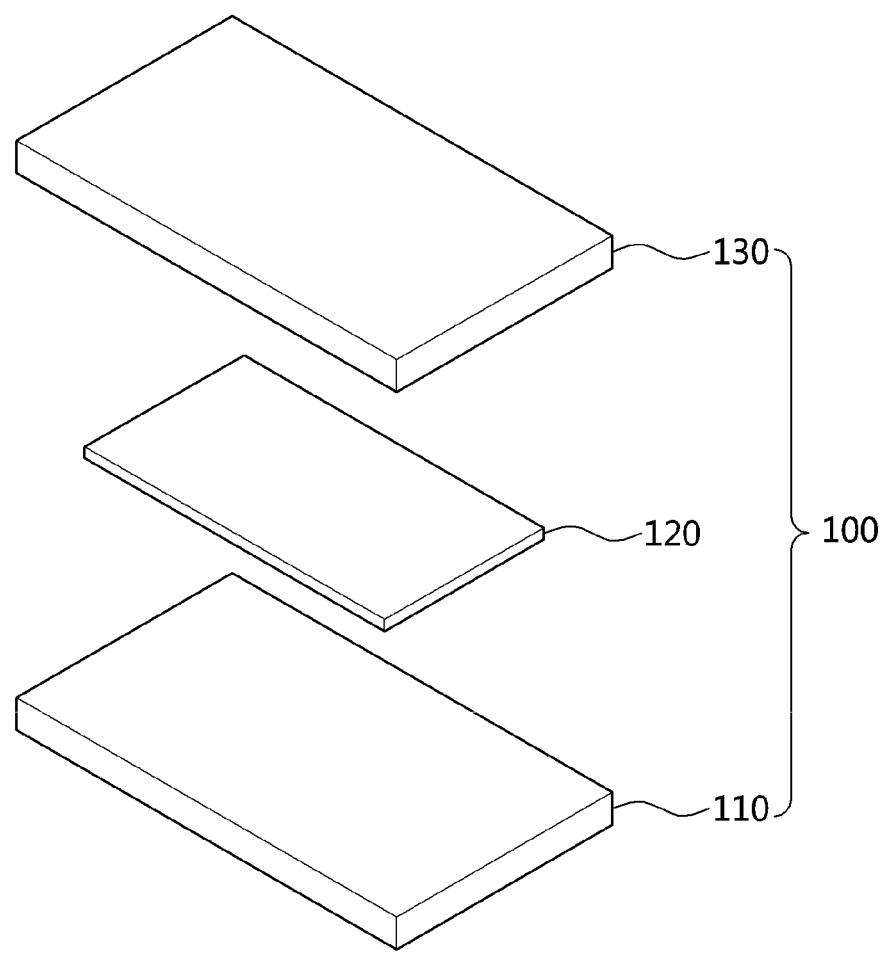
FIGS. 6 and 7 are views explaining an antenna module in accordance with a first embodiment of the present disclosure.
Figure 7:
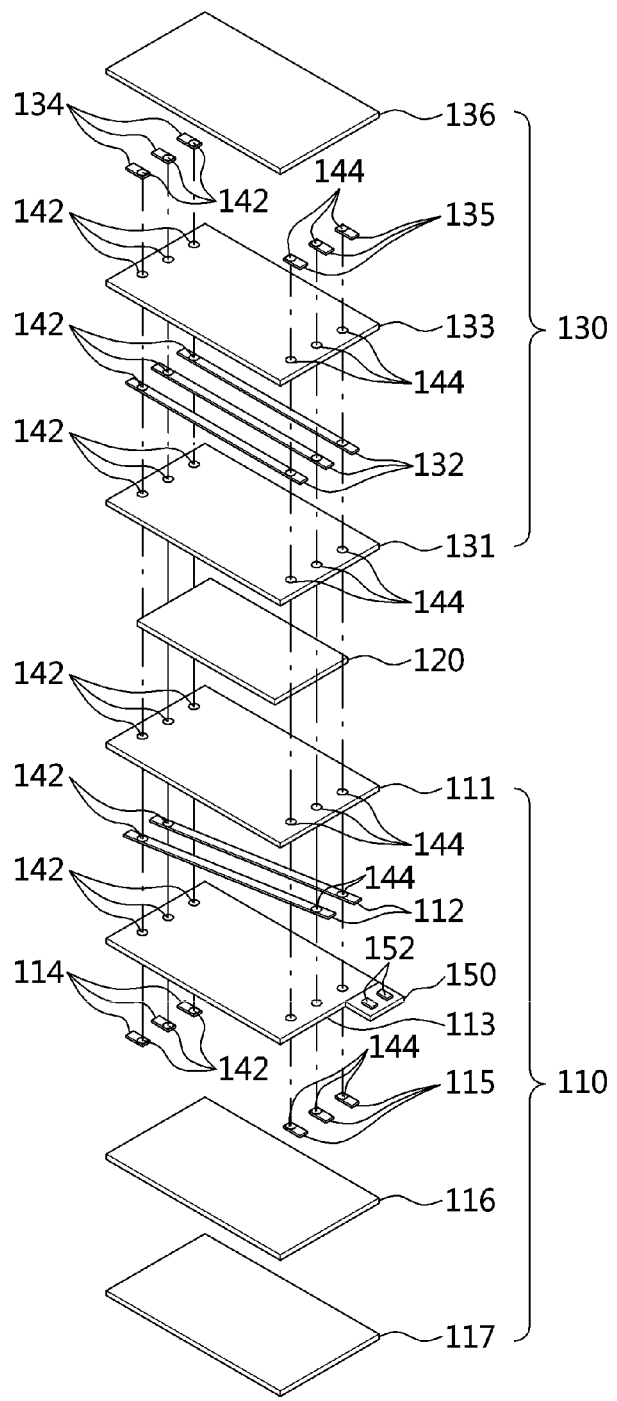

As illustrated in FIGS. 6 and 7, an antenna module 100 is configured to include a lower layer sheet 110, an electromagnetic wave shielding sheet 120, an upper layer sheet 130, and a connecting portion 140. In this case, the antenna module 100 is formed with a flexible printed circuit board, and mounted adjacent to an end portion of a mobile terminal.

The lower layer sheet 110 is formed with a flexible printed circuit board, and attached to a rear cover (a metal cover) or a rear surface of a main body of the mobile terminal. In this case, the lower layer sheet 110 has a first radiation pattern 112 formed on the lower layer sheet 110. The first radiation pattern has a plurality of radiation lines spaced from each other.

Figure 8:
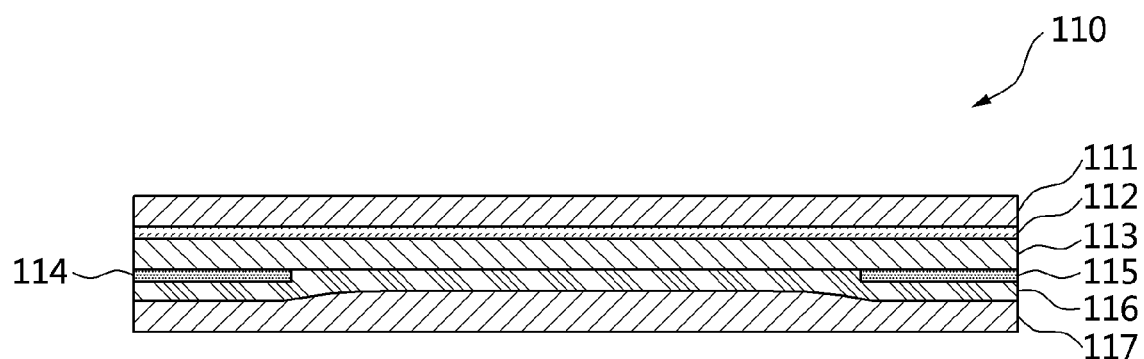
FIG. 8 is a view explaining a lower layer sheet of FIG. 6.

As illustrated in FIG. 8, the lower layer sheet 110 is configured to include a first adhesive sheet 111, the first radiation pattern 112, a first resin sheet 113, a first terminal portion 114, a second terminal portion 115, a lower protection sheet 116, and a second adhesive sheet 117. Herein, FIG. 7 is a view illustrating a cut surface of the lower layer sheet 110 and all configurations thereof are illustrated in order to easily describe the lower layer sheet 110, but some configurations thereof cannot be shown on the cut surface in accordance with a cut location.

The first adhesive sheet 111 is adhered to a lower surface of the electromagnetic wave shielding sheet 120. That is, the first adhesive sheet 111 is formed with an adhesive material generally used for configuration of a flexible printed circuit board, and thus an upper surface thereof is adhered to the lower surface of the electromagnetic wave shielding sheet 120.

The first radiation pattern 112 is coupled to a lower surface of the first adhesive sheet 111. In this case, the first radiation pattern 112 is formed with a copper material and includes a plurality of radiation lines spaced from each other at a predetermined interval. An upper surface of the first radiation pattern 112 is coupled to the lower surface of the first adhesive sheet 111.

The first resin sheet 113 is formed with a resin material, such as a polyimide to be coupled to a lower surface of the first radiation pattern 112. That is, an upper surface of the first resin sheet 113 is coupled to the lower surface of the first radiation pattern 112.

In this case, FIG. 6 illustrates that an outer terminal portion 150 is formed on a second resin sheet 133, but it is not limited thereto and can be also formed on the first resin sheet 113. That is, the first resin sheet 113 can be formed with a plurality of outer terminals 152 for connecting an antenna pattern formed in a direction perpendicular to the antenna module 100 with a connector (not shown) connected to an inner circuit (not shown) of a mobile terminal. Herein, the outer terminal portion 150 is extended in an outside direction and formed on one side of the first resin sheet 113, and has one surface formed with a plurality of outer terminals 152 connecting the connector and the antenna pattern.

The first terminal portion 114 is configured to include a plurality of terminals formed with a copper material. The first terminal portion 114 is coupled to a lower one side portion of the first resin sheet 113, and interposed between the first resin sheet 113 and one side of the lower protection sheet 116.

In this case, the plurality of terminals included in the first terminal portion 114 are formed to have the same line width as a radiation line of the first radiation pattern 112 to be positioned to have a one-to-one correspondence with the plurality of radiation lines.

The second terminal portion 115 is configured to include a plurality of terminals formed with a copper material. The second terminal portion 115 is coupled to the lower other side portion of the first resin sheet 113, and interposed between the first resin sheet 113 and the other side of the lower protection sheet 116. That is, the second terminal portion 115 is coupled to a lower surface of the first resin sheet 113 like the first terminal portion 114, and to the other side portion opposite to one side portion to which the first terminal portion 114 is coupled.

In this case, the plurality of terminals included in the second terminal portion 115 are formed to have the same line width as a radiation line of the first radiation pattern 112 to be positioned to have a one-to-one correspondence with the plurality of radiation lines.

Herein, the first terminal portion 114 and the second terminal portion 115 guide the locations where via holes 142, 144 connecting the first radiation pattern 112 and a second radiation pattern 132 are formed.

That is, since the via holes 142, 144 actually have very thin diameter, in case of not forming the via holes 142, 144 on exact locations, the first radiation pattern 112 and the second radiation pattern 132 are not connected, and thus it is difficult to implement a vertical directional antenna.

Accordingly, by forming the terminal portions 114, 115 that guide the locations where the via holes 142, 144 are formed, it becomes easy to manufacture the antenna module 100. In this case, the terminal portions 114, 115 are formed to have the same line width as the first radiation pattern 112 and the second radiation pattern 132, and a part thereof is mounted to overlap with the first radiation pattern 112 or the second radiation pattern 132.

Of course, the antenna module 100 can be configured not to include the first terminal portion 114 and the second terminal portion 115, and in the case that the outer terminal portion 150 is formed on the first resin sheet 113, can also connect the antenna pattern in a vertical direction to the outer terminal portion 150.

The lower protection sheet 116 is coupled to the first terminal portion 114, the second terminal portion 115, and the lower surface of the first resin sheet 113. In this case, the lower protection sheet 116 means coverlay generally used for a flexible printed circuit board.

The second adhesive sheet 117 is attached to a rear cover or a rear surface of a main body of a mobile terminal. That is, the second adhesive sheet 117 is formed with an adhesive material generally used for configuration of a flexible printed circuit board, and an upper surface thereof is attached to a lower surface of the lower protection sheet 116 and a lower surface thereof is attached to the rear cover or the rear surface of the main body thereof.

The electromagnetic wave shielding sheet 120 is composed of a sheet of an electromagnetic wave shielding material, such as a ferrite sheet. In this case, the electromagnetic wave shielding sheet 120 is formed with the area narrower than the lower layer sheet 110 and the upper layer sheet 130.

The lower surface of the electromagnetic wave shielding sheet 120 is adhered to an upper surface of the lower layer sheet 110, and layered the upper surface of the lower layer sheet 110. In this case, the electromagnetic wave shielding sheet 120 is adhered to an upper surface of the first adhesive sheet 111, and layered on the upper surface of the lower layer sheet 110. The upper layer sheet 130 is formed with a flexible printed circuit board, and layered on the electromagnetic wave shielding sheet 120. In this case, the upper layer sheet 130 is formed with the second radiation pattern 132 composed of a plurality of radiation lines spaced from each other.

A lower surface of the upper layer sheet 130 is attached to the electromagnetic wave shielding sheet 120, and layered on an upper surface of the electromagnetic wave shielding sheet 120. In this case, since the electromagnetic wave shielding sheet 120 is formed to have the area narrower than the lower layer sheet 110 and the upper layer sheet 130, a part of both ends of the upper layer sheet 130 is bonded with the lower layer sheet 110.

Figure 9:
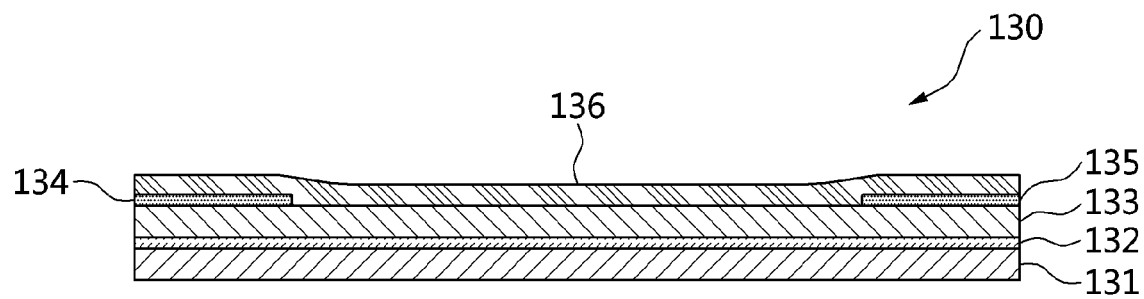
FIG. 9 is a view explaining an upper layer sheet of FIG. 6.

Referring to FIG. 9, the upper layer sheet 130 is configured to include a third adhesive sheet 131, the second radiation pattern 132, the second resin sheet 133, a third terminal portion 134, a fourth terminal portion 135, and an upper protection sheet 136. Herein, FIG. 8 is a view illustrating a cut surface of the upper layer sheet 130 and illustrates all configurations thereof for easily describing the upper layer sheet 130, but some configurations thereof cannot be shown on the cut surface in accordance with a cut location.

The third adhesive sheet 131 is adhered to the upper surface of the electromagnetic wave shielding sheet 120. That is, the third adhesive sheet 131 is formed with an adhesive material generally used for configuration of a flexible printed circuit board, and adhered to the upper surface of the electromagnetic wave shielding sheet 120. In this case, since the third adhesive sheet 131 is formed so that the electromagnetic wave shielding sheet 120 has the area narrower than the lower layer sheet 110 and the upper layer sheet 130, a part of both ends thereof is adhered (layered) on the upper portion of the lower layer sheet.

The second radiation pattern 132 is coupled to an upper surface of the third adhesive sheet 131. In this case, the second radiation pattern 132 is formed with a copper material, and includes a plurality of radiation lines spaced from each other at a predetermined interval. A lower surface of the second radiation pattern 132 is coupled to the upper surface of the third adhesive sheet 131.

The second resin sheet 133 is formed with a resin material, such as a polyimide to be coupled to an upper surface of the second radiation pattern 132. That is, a lower surface of the second resin sheet 133 is coupled to the upper surface of the second radiation pattern 132.

In this case, the second resin sheet 133 can be formed with the outer terminal portion 150 for connecting the antenna pattern formed on the antenna module 100 in a vertical direction with a connector (not shown) connected to an inner circuit (not shown) of the mobile terminal. Herein, the outer terminal portion 150 is extended in an outside direction and formed on one side of the second resin sheet 133, and one surface thereof is formed with a plurality of outer terminals 152 connecting the connector and the antenna pattern.

The third terminal portion 134 is configured to include a plurality of terminals formed with a copper material. The third terminal portion 134 is coupled to upper one side portion of the second resin sheet 133, and interposed between the second resin sheet 133 and one side of the upper protection sheet 136.

In this case, the plurality of terminals included in the third terminal portion 134 are formed to have the same line width as the radiation line of the second radiation pattern 132 to be positioned to have a one-to-one correspondence with the plurality of radiation lines.

The fourth terminal portion 135 is configured to include a plurality of terminals formed with a copper material. The fourth terminal portion 135 is coupled to an upper other side portion of the second resin sheet 133, and interposed between the second resin sheet 133 and the other side of the upper protection sheet 136. That is, the fourth terminal portion 135 is coupled to the lower surface of the first resin sheet 113 like the third terminal portion 134, and to the other side portion opposite to one side portion to which the third terminal portion 134 is coupled.

In this case, the plurality of terminals included in the fourth terminal portion 135 are formed to have the same line width as the radiation line of the second radiation pattern 132 to be positioned to have a one-to-one correspondence with the plurality of radiation lines.

Herein, the third terminal portion 134 and the fourth terminal portion 135 guide the locations where the via holes 142, 144 connecting the first radiation pattern 112 and the second radiation pattern 132 are formed.

That is, since the via holes 142, 144 actually have very thin diameter, in case of not forming the via holes 142, 144 on exact locations, the first radiation pattern 112 and the second radiation pattern 132 are not connected, and thus it is difficult to implement a vertical directional antenna.

Accordingly, by forming the terminal portions 134, 135 that guide the locations where the via holes 142, 144 are formed, it becomes easy to manufacture the antenna module 100. In this case, the terminal portions 134, 135 are formed to have the same line width as the first radiation pattern 112 and the second radiation pattern 132, and a part thereof is mounted to overlap with the first radiation pattern 112 or the second radiation pattern 132.

Of course, the antenna module 100 can be also configured not to include the third terminal portion 134 and the fourth terminal portion 135, and in the case that the outer terminal portion 150 is formed on the second resin sheet 133, can also connect the antenna pattern in a vertical direction to the outer terminal portion 150.

The upper protection sheet 136 is coupled to the third terminal portion 134, the fourth terminal portion 135, and the upper surface of the second resin sheet 133. In this case, the upper protection sheet 136 means coverlay generally used for a flexible printed circuit board.

A connecting portion 140 electrically connects the first radiation pattern 112 and the second radiation pattern 132. That is, the connecting portion 140 electrically connects the first radiation pattern 112 formed on the lower layer sheet 110 and the second radiation pattern 132 formed on the upper layer sheet 130.

Figure 10:
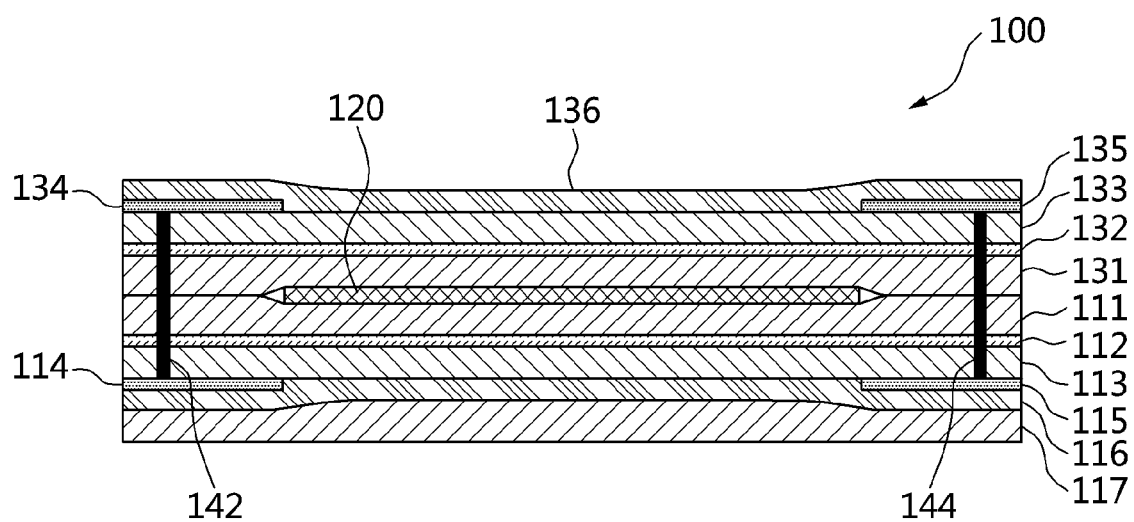
FIG. 10 is a view explaining a connecting portion of FIG. 6.

For this purpose, as illustrated in FIG. 10, the connecting portion 140 is configured to include the first via hole 142 and the second via hole 144.

The first via hole 142 and the second via hole 144 are formed on the first resin sheet 113, the first radiation pattern 112, the first adhesive sheet, the third adhesive sheet, the second radiation pattern 132, and one side of the second resin sheet 133. In this case, the first via hole 142 electrically connects the first terminal portion 114, the first radiation pattern 112, the second radiation pattern 132, and the third terminal portion 134; and the second via hole 144 electrically connects the second terminal portion 115, the first radiation pattern 112, the second radiation pattern 132, and the fourth terminal portion 135.

In this case, in the antenna module 100, as the lower layer sheet 110, the electromagnetic wave shielding sheet 120, and the upper layer sheet 130 are layered, the lower layer sheet 110 and both ends of the upper layer sheet 130 are bonded.

As the lower layer sheet 110 and both ends of the upper layer sheet 130 are bonded, the via holes 142, 144 formed on the lower layer sheet 110 and the upper layer sheet 130 are electrically connected.

Figure 11:
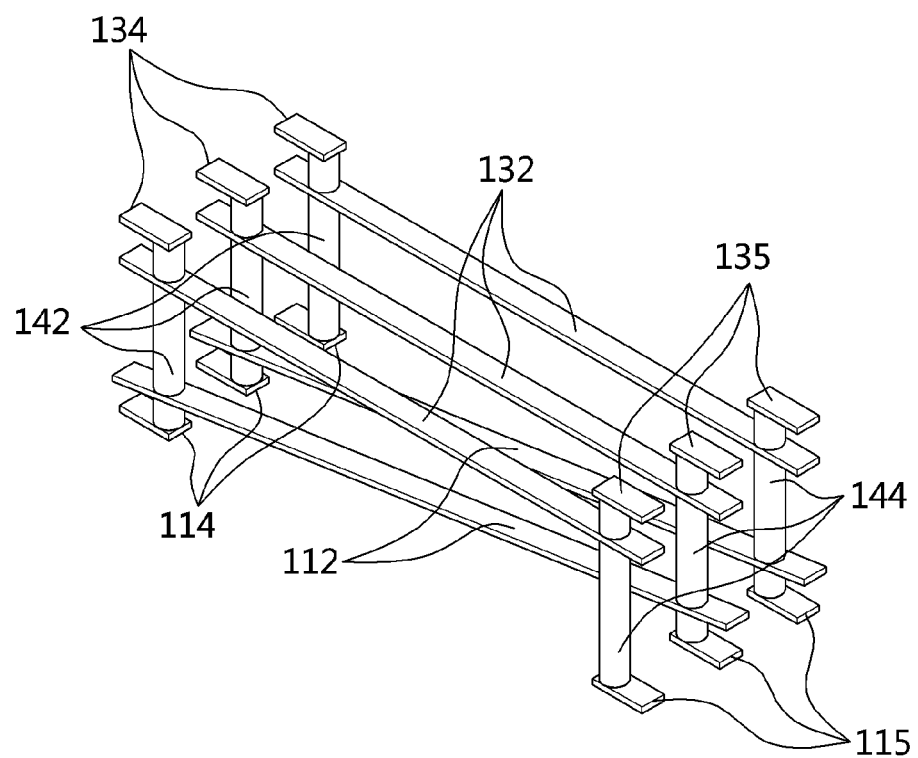
FIGS. 11 and 12 are views explaining an antenna characteristic of the antenna module in accordance with the first embodiment of the present disclosure.

Thus, as illustrated in FIG. 11, the antenna module 100 connects the radiation patterns formed on the lower layer sheet 110 and the upper layer sheet 130 through the via holes 142, 144 to thus form an antenna pattern having the shape wound in a vertical direction of the electromagnetic wave shielding sheet 120. That is, the antenna module 100 is formed with the shape that the first radiation pattern 112, the second radiation pattern 132, and the connecting portion 140 are connected with each other to wind the electromagnetic wave shielding sheet 120.

Figure 12:
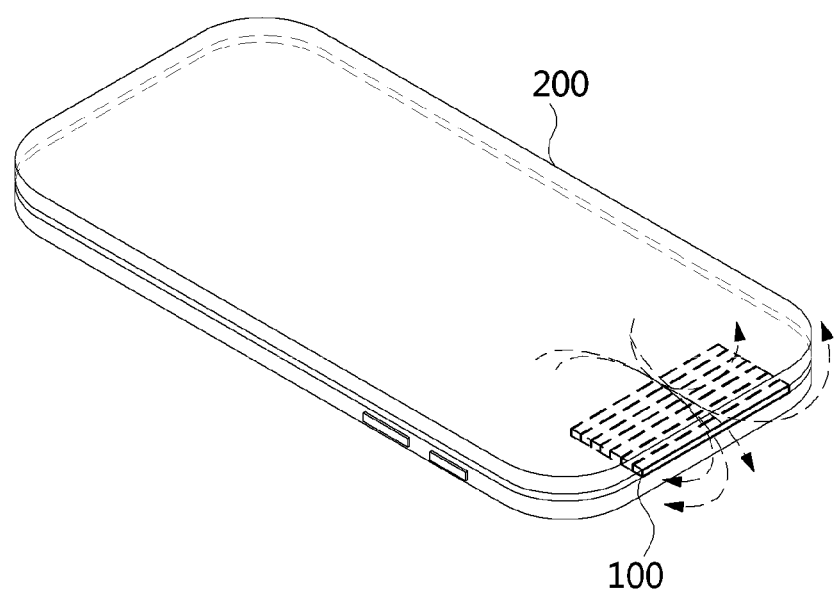

The antenna module 100 is positioned on the rear surface of the main body or the rear cover of the mobile terminal. In this case, as illustrated in FIG. 12, the rear cover of a metal material performs a shielding function, but a radiation field is formed in a horizontal direction and in a vertical direction by an electromagnetic signal that is radiated from a side surface of the antenna module 100.

Accordingly, the antenna module 100 can implement an antenna characteristic more than a minimum reference for performing a NFC communication and a MST communication on a side surface and a rear surface of the mobile terminal, and can maintain antenna performance that is equal to or better than that of the case mounted on a non-metal cover.

Hereinafter, an antenna module in accordance with a second embodiment of the present disclosure will be described in detail with reference to the accompanying drawings.

Figure 13:
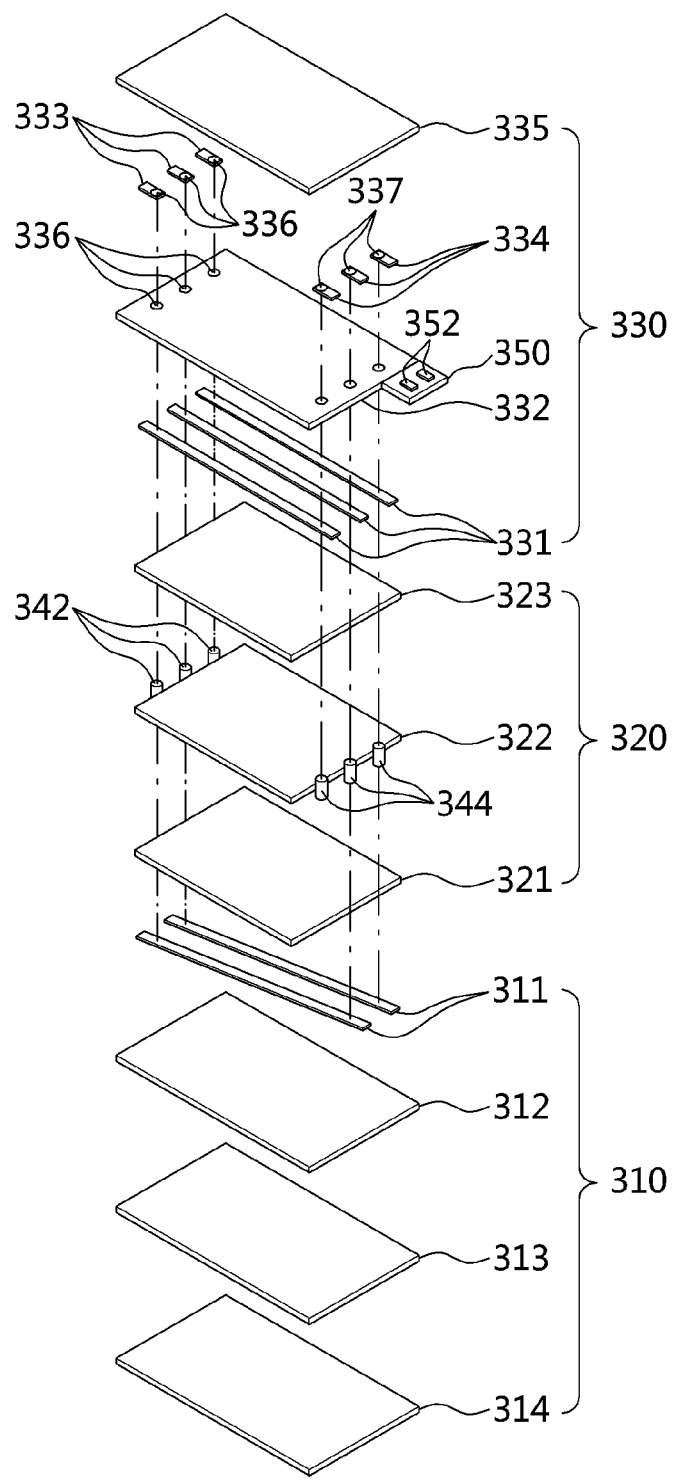
FIG. 13 is a view explaining an antenna module in accordance with a second embodiment of the present disclosure.

As illustrated in FIG. 13, the antenna module 300 is configured to include a lower layer sheet 310, an electromagnetic wave shielding sheet 320, an upper layer sheet 330, and a connecting portion 340. In this case, the antenna module 300 is formed with a flexible printed circuit board, and mounted adjacent to an end portion of the mobile terminal.

The lower layer sheet 310 is formed with a flexible printed circuit board, and attached to the rear cover (the metal cover) or the rear surface of the main body of the mobile terminal. The lower layer sheet 310 has a lower surface, which is attached to the rear cover or the rear surface of the main body thereof, formed with a first radiation pattern 311. In this case, the first radiation pattern 311 is composed of a plurality of radiation lines spaced from each other.

Figure 14:
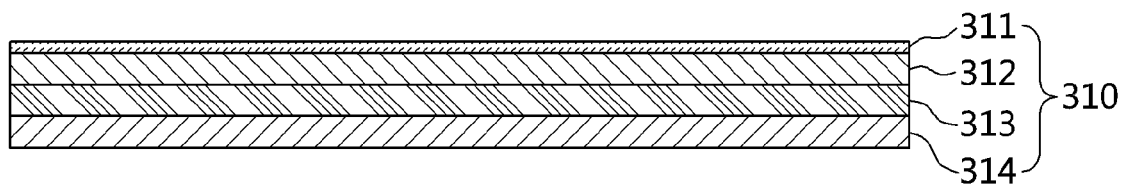
FIG. 14 is a view explaining a lower layer sheet of FIG. 13.

Referring to FIG. 14, the lower layer sheet 310 is configured to include the first radiation pattern 311, a first resin sheet 312, a lower protection sheet 313, and a first adhesive sheet 314. Herein, FIG. 13 is a view illustrating a cut surface of the lower layer sheet 310 and illustrates all configurations thereof for easily describing the lower layer sheet 310, but some configurations (for example, the first radiation pattern 311) thereof cannot be shown on the cut surface in accordance with a cut location.

The first radiation pattern 311 is coupled to a lower surface of the electromagnetic wave shielding sheet 320. In this case, the first radiation pattern 311 is formed with a copper material, and includes a plurality of radiation lines spaced from each other at a predetermined interval. An upper surface of the first radiation pattern 311 is coupled to the lower surface of the electromagnetic wave shielding sheet 320.

The first resin sheet 312 is formed with a resin material, such as a polyimide to be coupled to a lower surface of the first radiation pattern 311. That is, an upper surface of the first resin sheet 312 is coupled to the lower surface of the first radiation pattern 311.

The lower protection sheet 313 is coupled to a lower surface of the first resin sheet 312. In this case, the lower protection sheet 313 means Coverlay generally used for a flexible printed circuit board.

The first adhesive sheet 314 is attached to the rear cover or the rear surface of the main body of the mobile terminal. That is, the first adhesive sheet 314 is formed with an adhesive material generally used for configuration of a flexible printed circuit board, and an upper surface thereof is attached to a lower surface of the lower protection sheet 313 and a lower surface thereof is attached to the rear cover or the rear surface of the main body thereof.

The electromagnetic wave shielding sheet 320 is composed of a sheet of an electromagnetic wave shielding material, such as a ferrite sheet, and layered on the lower layer sheet 310. In this case, the electromagnetic wave shielding sheet 320 is formed with the area narrower than the lower layer sheet 310 and the upper layer sheet 330. Accordingly, the lower layer sheet 310 and both ends of the upper layer sheet 330 are spaced to form a separated space.

Figure 15:
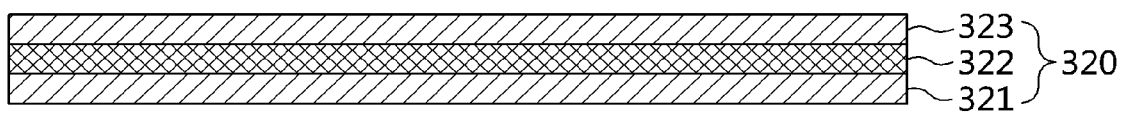
FIG. 15 is a view explaining an electromagnetic wave shielding sheet of FIG. 13.

In this case, as illustrated in FIG. 15, the electromagnetic wave shielding sheet 320 is configured to include a second adhesive sheet 321 having a lower surface adhered to an upper surface of the lower layer sheet 310; a shielding sheet 322 attached to an upper surface of the second adhesive sheet 321; and a third adhesive sheet 323 having a lower surface attached to an upper surface of the shielding sheet 322 and having an upper surface attached to a lower surface of the upper layer sheet 330.

The upper layer sheet 330 is formed with a flexible printed circuit board, and layered on the electromagnetic wave shielding sheet 320. In this case, an upper surface of the upper layer sheet 330 is formed with a second radiation pattern 331 composed of a plurality of radiation lines spaced from each other.

The lower surface of the upper layer sheet 330 is attached to the electromagnetic wave shielding sheet 320, and layered on an upper surface of the electromagnetic wave shielding sheet 320. In this case, since the electromagnetic wave shielding sheet 320 is formed to have the area narrower than the lower layer sheet 310 and the upper layer sheet 330, a part of both ends of the upper layer sheet 330 is spaced from the lower layer sheet 310 to form a separated space.

Figure 16:
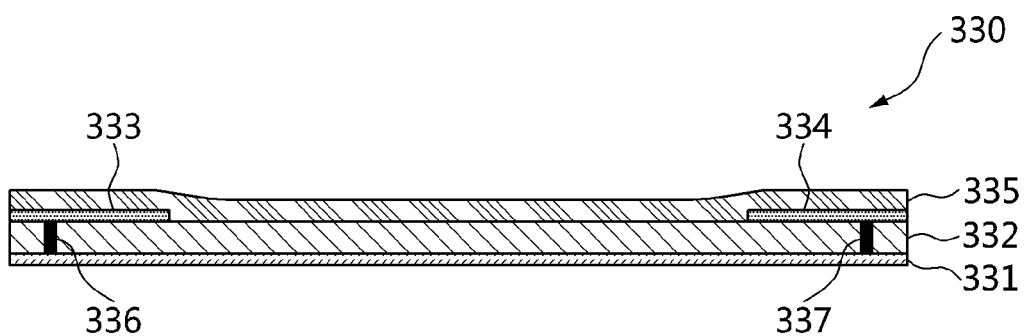
FIG. 16 is a view explaining an upper layer sheet of FIG. 13.

Referring to FIG. 16, the upper layer sheet 330 is configured to include the second radiation pattern 331, a second resin sheet 332, a first terminal portion 333, a second terminal portion 334, and an upper protection sheet 335. Herein, FIG. 15 is a view illustrating a cut surface of the upper layer sheet 330 and illustrates all configurations thereof for easily describing the lower layer sheet 330, but some configurations (for example, the second radiation pattern 331) thereof cannot be shown on the cut surface in accordance with a cut location.

The second radiation pattern 331 is coupled to the upper surface of the electromagnetic wave shielding sheet 320. In this case, the second radiation pattern 331 is formed with a copper material, and includes a plurality of radiation lines spaced from each other at a predetermined interval. A lower surface of the second radiation pattern 331 is coupled to an upper surface of a third adhesive sheet 323.

The second resin sheet 332 is formed with a resin material, such as a polyimide to be coupled to an upper surface of the second radiation pattern 331. That is, a lower surface of the second resin sheet 332 is coupled to the upper surface of the second radiation pattern 331.

In this case, the second resin sheet 332 can be also formed with an outer terminal portion 350 for connecting an antenna pattern formed on the antenna module 100 in a vertical direction with a connector (not shown) connected to an inner circuit (not shown) of the mobile terminal. Herein, the outer terminal portion 350 is extended in an outside direction and formed on one side of the second resin sheet 332, and one surface thereof is formed with a plurality of outer terminals 352 connecting the connector and the antenna pattern.

In case of mounting the antenna module 300 in the mobile terminal, the connector connected to the inner circuit of the mobile terminal is formed on the location higher than the inner circuit. Accordingly, the outer terminal portion 350 for connecting the antenna module and the connector on the upper layer sheet 330 is formed.

The first terminal portion 333 is configured to include a plurality of terminals formed with a copper material. The first terminal portion 333 is coupled to an upper one side portion of the second resin sheet 332, and interposed between the second resin sheet 332 and one side of the upper protection sheet 335. The first terminal portion 333 is connected with the second radiation pattern 331 through a via hole 336.

In this case, the plurality of terminals included in the first terminal portion 333 are formed to have the same line width as the radiation lines of the second radiation pattern 331 to be positioned to have a one-to-one correspondence with the plurality of radiation lines.

The second terminal portion 334 is configured to include a plurality of terminals formed with a copper material. The second terminal portion 334 is coupled to an upper other side portion of the second resin sheet 332, and interposed between the second resin sheet 332 and the other side of the upper protection sheet 335. That is, the second terminal portion 334 is coupled to the lower surface of the second resin sheet 332 like the first terminal portion 333, and coupled to the other side portion opposite to one side portion to which the first terminal portion 333 is coupled. The second terminal portion 334 is connected with the second radiation pattern 331 through a via hole 337.

In this case, the plurality of terminals included in the second terminal portion 334 are formed to have the same line width as the radiation line of the second radiation pattern 331 to be positioned to have a one-to-one correspondence with the plurality of radiation lines.

Herein, the first terminal portion 333 and the second terminal portion 334 guide the locations where the via holes 336, 337 connecting the second radiation pattern 331 are formed.

That is, since the via holes 336, 337 actually have very thin diameter, in case of not forming the via holes 336, 337 on exact locations, the second radiation pattern 331 is not connected thereto. In this case, although the outer terminal portion 350 is connected to one of the first terminal portions 333 and one of the second terminal portions 334, it is impossible to implement a vertical directional antenna.

Accordingly, by forming the terminal portions 333, 334 that guide the locations where the via holes 336, 337 are formed and that connect with the outer terminal portion 350, it becomes easy to manufacture the antenna module 300. In this case, the terminal portions 333, 334 are formed to have the same line width as the second radiation pattern 331, and a part thereof is mounted to overlap with the second radiation pattern 331.

Of course, the antenna module 300 can be also configured not to include the first terminal portion 333 and the second terminal portion 334.

The upper protection sheet 335 is coupled to the first terminal portion 333, the second terminal portion 334, and an upper surface of the second resin sheet 332. In this case, the upper protection sheet 335 means Coverlay generally used for a flexible printed circuit board.

The connecting portion 340 electrically connects the first radiation pattern 311 and the second radiation pattern 331. That is, the connecting portion 340 is formed in a separated space, which is formed between the lower layer sheet 310 and both ends of the upper layer sheet 330, and electrically connects the first radiation pattern 311 formed on the lower layer sheet 310 and the second radiation pattern 331 formed on the upper layer sheet 330.

Figure 17:
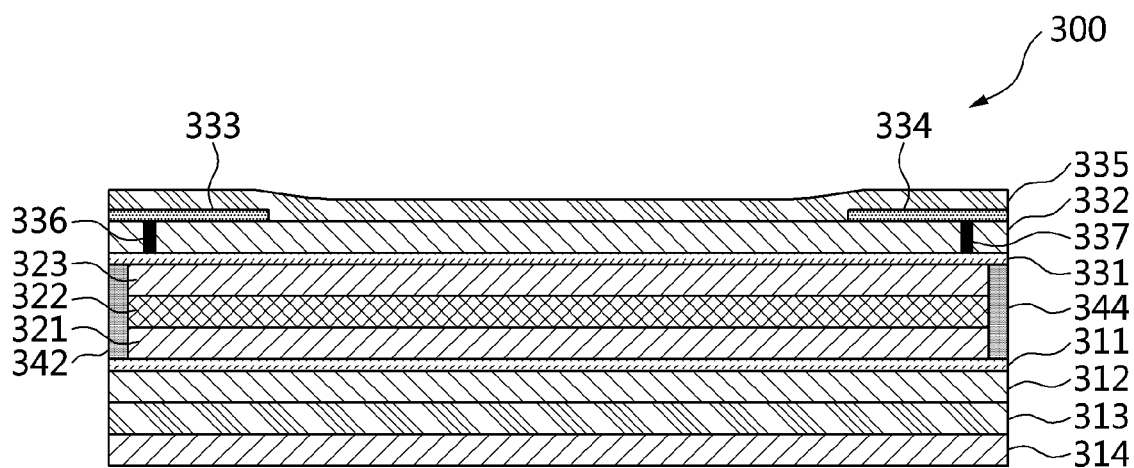
FIG. 17 is a view explaining a connecting portion of the electromagnetic wave shielding sheet of the antenna module in accordance with the second embodiment of the present disclosure.

In this case, as illustrated in FIG. 17, the connecting portion 340 is configured to include a first soldering portion 342 and a second soldering portion 344 electrically connecting the first radiation pattern 311 and the second radiation pattern 331.

In this case, the first soldering portion 342 is formed in a separated space, which is formed between one side of the lower layer sheet 310 and one side of the upper layer sheet 330, and connects one side of the first radiation pattern 311 and one side of the second radiation pattern 331.

The second soldering portion 344 is formed in a separated space, which is formed between the other side of the lower layer sheet 310 and the other side of the upper layer sheet 330, and connects the other side of the first radiation pattern 311 and the other side of the second radiation pattern 331.

Thus, the antenna module 300 connects the radiation patterns formed on the lower layer sheet 310 and the upper layer sheet 330 through the via holes to form an antenna pattern having the shape wound in a vertical direction of the electromagnetic wave shielding sheet 320. That is, the antenna module 300 is formed with the shape that the first radiation pattern 311, the second radiation pattern 331, and the connecting portion 340 are connected with each other to wind the electromagnetic wave shielding sheet 320.

The antenna module 300 is positioned on the rear surface of the main body or the rear cover of the mobile terminal. In this case, the rear cover of a metal material performs a shielding function, but a radiation field is formed in a horizontal direction and a vertical direction by an electromagnetic signal that is radiated from a side surface of the antenna module 300.

Accordingly, the antenna module 300 can implement an antenna characteristic more than a minimum reference for performing a NFC communication or a MST communication on a side surface and a rear surface of the mobile terminal, and can maintain antenna performance that is equal to or better than that of the case mounted on a non-metal cover.

As described above, by providing the antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there are the effects that can implement performance of a MST antenna required for a standard of the mobile terminal to which a metal cover is applied, and can implement antenna performance that is equal to or better than that of the conventional MST antenna module mounted on a mobile terminal to which a cover of a material, other than a metal, is applied.

Further, by providing the antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there is the effect that can implement performance of a NFC antenna and performance of a MST antenna in a vertical direction (i.e., a side surface of the mobile terminal) as well as in a horizontal direction (i.e., a rear surface of the mobile terminal).

Further, by providing a MST antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there is the effect that can minimize deviation of performance of the NFC antenna and performance of the MST antenna in accordance with an angle therebetween.

Further, by providing the antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there are the effects that can implement an antenna (i.e., the NFC antenna, the MST antenna) characteristic more than a minimum reference for performing a NFC communication on a side surface and a rear surface of the mobile terminal, and can maintain antenna performance that is equal to or better than that of the case mounted on a non-metal cover.

Further, by providing the antenna module that layers layer sheets having a radiation pattern formed on both surfaces of a shielding sheet, respectively, and connects the radiation patterns through a via hole or by a soldering to form an antenna pattern in a vertical direction of an electromagnetic wave shielding sheet, there is the effect that can use even the outermost surface of the antenna module as a radiation pattern forming area, thus minimizing an open area (i.e., the area that cannot form the radiation pattern).

Further, by providing the antenna module that maximizes the radiation pattern forming area to minimize the open area, there is the effect that can increase the area (or a length) of the radiation pattern, thus maximizing antenna performance.

Further, by providing the antenna module that has a one-to-one correspondence with the radiation patterns formed on both surfaces of the shielding sheet and forms terminal portions having the same line width as the radiation patterns, there is the effect that can guide the location where a via hole connecting the radiation patterns is formed, thus easily manufacturing an antenna pattern in a vertical direction.

Further, by providing the antenna module that selectively forms an outer terminal portion on at least one of resin sheets included in the layer sheets formed on both surfaces of the shielding sheet, there is the effect that can easily connect the antenna module regardless of the location (height) of a connector formed on the mobile terminal.

While the present disclosure has been described with respect to the specific embodiments, it will be apparent to those skilled in the art that various changes and modifications may be made without departing from the spirit and scope of the disclosure as defined in the following claims.

The invention claimed is:

1. An antenna module formed with a flexible printed circuit board and mounted adjacent to an end portion of a mobile terminal, comprising:
   a lower layer sheet mounted in the mobile terminal, and having a first radiation pattern formed on the lower layer sheet;
   an electromagnetic wave shielding sheet with an area narrower than the lower layer sheet, and layered on top of the lower layer sheet;
   an upper layer sheet layered on top of the electromagnetic wave shielding sheet, and having a second radiation pattern formed on the upper layer sheet, a part of both ends of the upper layer sheet being attached to the lower layer sheet; and
   a connecting portion connecting the first radiation pattern and the second radiation pattern,
   wherein the upper layer sheet comprising:
   a third adhesive sheet adhered to an upper surface of the electromagnetic wave shielding sheet, a part of both ends of the third adhesive sheet being adhered to an upper surface of the lower layer sheet;
   a second radiation pattern having a plurality of radiation lines positioned to be spaced from each other, and layered on an upper surface of the third adhesive sheet;
   a second resin sheet layered on an upper surface of the second radiation pattern; and
   an upper protection sheet layered on an upper surface of the second resin sheet.

2. The antenna module according to claim 1, wherein the lower layer sheet comprises:
   a first adhesive sheet, an upper surface of the first adhesive sheet adhered to a lower surface of the electromagnetic wave shielding sheet and the part of both ends of the upper layer sheet;
   a first radiation pattern having a plurality of radiation lines positioned to be spaced from each other, and layered on a lower surface of the first adhesive sheet;
   a first resin sheet layered on a lower surface of the first radiation pattern;
   a lower protection sheet layered on a lower surface of the first resin sheet; and
   a second adhesive sheet having one surface attached to a lower surface of the lower protection sheet, and having the other surface attached to a rear cover or a main body of the mobile terminal.

3. The antenna module according to claim 2, wherein the lower layer sheet further comprises a terminal portion having a plurality of terminals which are interposed between one side of the first resin sheet and one side of the lower protection sheet, positioned to correspond to the plurality of radiation lines, respectively.

4. The antenna module according to claim 2, wherein the lower layer sheet further comprises an outer terminal portion extended in an outside direction from one side of the first resin sheet, and having one surface formed with a plurality of outer terminals to be connected with a connector of the mobile terminal.

5. The antenna module according to claim 1, wherein the upper layer sheet further comprises a terminal portion having a plurality of terminals which are interposed between one side of the second resin sheet and one side of the upper protection sheet, positioned to correspond to the plurality of radiation lines, respectively.

6. The antenna module according to claim 1, wherein the upper layer sheet further comprises an outer terminal portion extended in an outside direction from one side of the second resin sheet, and having one surface formed with a plurality of outer terminals to be connected with a connector of the mobile terminal.

7. The antenna module according to claim 1, wherein the connecting portion comprises:
   a first via hole formed on one side of the lower layer sheet and one side of the upper layer sheet, and connecting the first radiation pattern and the second radiation pattern; and
   a second via hole formed on the other side of the lower layer sheet and the other side of the upper layer sheet, and connecting the first radiation pattern and the second radiation pattern.

8. The antenna module according to claim 1, wherein the connecting portion connects the first radiation pattern and the second radiation pattern to form an antenna pattern in a vertical direction of the electromagnetic wave shielding sheet,
   wherein the first radiation pattern, the second radiation pattern, and the connecting portion are connected with each other to wind the electromagnetic wave shielding sheet.

9. An antenna module formed with a flexible printed circuit board and mounted adjacent to an end portion of a mobile terminal, comprising:
   a lower layer sheet mounted in the mobile terminal, and having a first radiation pattern formed on the lower layer sheet;
   an electromagnetic wave shielding sheet with an area narrower than the lower layer sheet, and layered on top of the lower layer sheet;
   an upper layer sheet layered on top of the electromagnetic wave shielding sheet, and having a second radiation pattern formed on the upper layer sheet, a part of both ends of the upper layer sheet being spaced from the lower layer sheet to form a separated space; and
   a connecting portion formed in the separated space, which is formed on both ends of the lower layer sheet and the upper layer sheet, and connecting the first radiation pattern and the second radiation pattern,
   wherein the upper layer sheet comprising:

a second radiation pattern composed of a plurality of radiation lines positioned to be spaced from each other, and layered on an upper surface of the electromagnetic wave shielding sheet;

a second resin sheet layered on an upper surface of the second radiation pattern; and an upper protection sheet layered on an upper surface of the second resin sheet.

10. The antenna module according to claim 9, wherein the lower layer sheet comprising:

a first radiation pattern having a plurality of radiation lines positioned to be spaced from each other, and layered on a lower portion of the electromagnetic wave shielding sheet;

a first resin sheet layered on a lower surface of the first radiation pattern:

a lower protection sheet layered on a lower surface of the first resin sheet; and a first adhesive sheet having one surface attached to a lower surface of the lower protection sheet, and having the other surface attached to a rear cover or a main body of the mobile terminal.

11. The antenna module according to claim 9, wherein the electromagnetic wave shielding sheet comprising:

a second adhesive sheet having a lower surface adhered to the lower layer sheet;

a shielding sheet attached to an upper surface of the second adhesive sheet; and a third adhesive sheet having a lower surface adhered to the shielding sheet, and having an upper surface adhered to a lower surface of the upper layer sheet.

12. The antenna module according to claim 9, wherein the upper layer sheet further comprises, a terminal portion having a plurality of terminals which are interposed between one side of the second resin sheet and one side of the upper protection sheet, positioned to correspond to the plurality of radiation lines, respectively.

13. The antenna module according to claim 9, wherein the upper layer sheet further comprises an outer terminal portion extended in an outside direction from one side of the second resin sheet, and having one surface formed with a plurality of outer terminals to be connected with a connector of the mobile terminal.

14. The antenna module according to claim 9, wherein the connecting portion comprising:

a first soldering portion formed in a separated space, which is formed between one side of the lower layer sheet and one side of the upper layer sheet, and connecting one side of the first radiation pattern and one side of the second radiation pattern; and a second soldering portion formed in a separated space, which is formed between the other side of the lower layer sheet and the other side of the upper layer sheet, and connecting one side of the first radiation pattern and the other side of the second radiation pattern.

15. The antenna module according to claim 9, wherein the connecting portion connects the first radiation pattern and the second radiation pattern to form an antenna pattern in a vertical direction of the electromagnetic wave shielding sheet, wherein the first radiation pattern, the second radiation pattern, and the connecting portion are connected with each other to wind the electromagnetic wave shielding sheet.

\* \* \* \* \*